United States Patent [19]

Horikawa

[11] Patent Number: 5,169,373
[45] Date of Patent: Dec. 8, 1992

[54] TOOL STORAGE APPARATUS

[75] Inventor: Yoshiharu Horikawa, Shimizu, Japan

[73] Assignee: Matsuura Machinery Corporation, Fukui, Japan

[21] Appl. No.: 742,996

[22] Filed: Aug. 9, 1991

[30] Foreign Application Priority Data

Apr. 8, 1991 [JP] Japan .................. 3-75144

[51] Int. Cl.⁵ .......................... B23Q 3/157
[52] U.S. Cl. ........................ 483/40; 211/69; 483/48; 483/51; 483/58
[58] Field of Search .......... 29/568; 211/1.5, 69; 483/22, 23, 27, 29, 36, 37, 38, 39, 40, 41, 51, 54, 58, 59, 61, 63, 65, 69

[56] References Cited

U.S. PATENT DOCUMENTS

| | | |
|---|---|---|
| 3,249,997 | 5/1966 | Hutchens .................. 29/568 |
| 3,546,774 | 12/1970 | Stöferle et al. ............ 29/568 |
| 3,709,623 | 1/1973 | Stephan et al. ............ 29/568 X |
| 3,715,001 | 2/1973 | Sato ........................ 29/568 |
| 4,110,898 | 9/1978 | Yamaoka et al. .......... 29/568 |
| 4,428,109 | 1/1984 | Seeger ..................... 29/568 |
| 4,443,928 | 4/1984 | Kielma ..................... 29/568 |
| 4,558,506 | 12/1985 | Kielma ..................... 29/568 |
| 4,866,835 | 9/1989 | Novak ..................... 211/1.5 X |

FOREIGN PATENT DOCUMENTS 185338 7/1990 Japan ....................... 483/65

Primary Examiner—William Briggs
Attorney, Agent, or Firm—Jordan and Hamburg

[57] ABSTRACT

The tool storage apparatus according to the present invention includes holder units consisted by a strut and a multiplicity of holders adapted to hold tools. Holders are arranged in two rows and in each row, the holders are arranged one above another and in the adjacent rows the openings for receiving tools are opened in the opposite direction relative to each other.

4 Claims, 9 Drawing Sheets

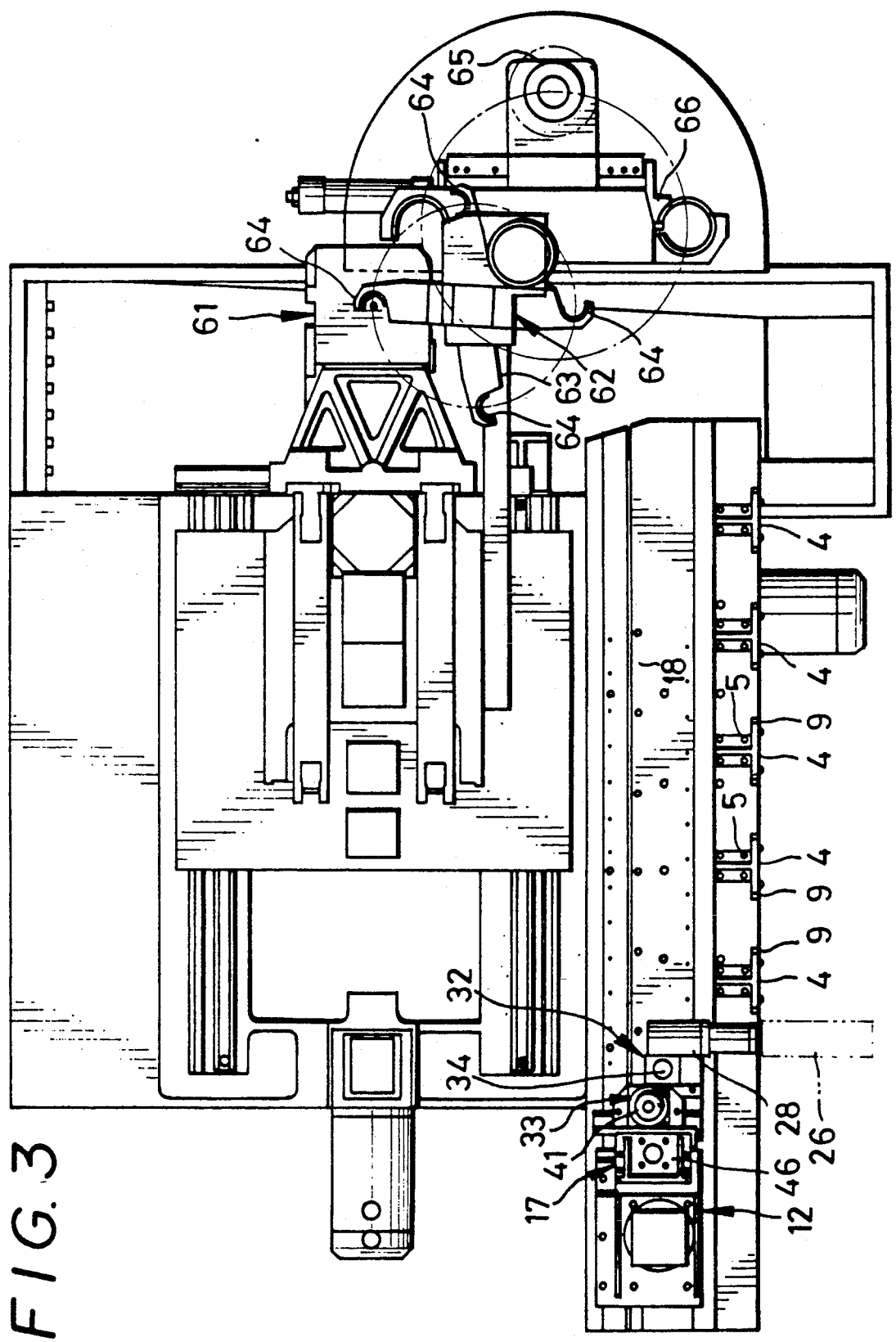

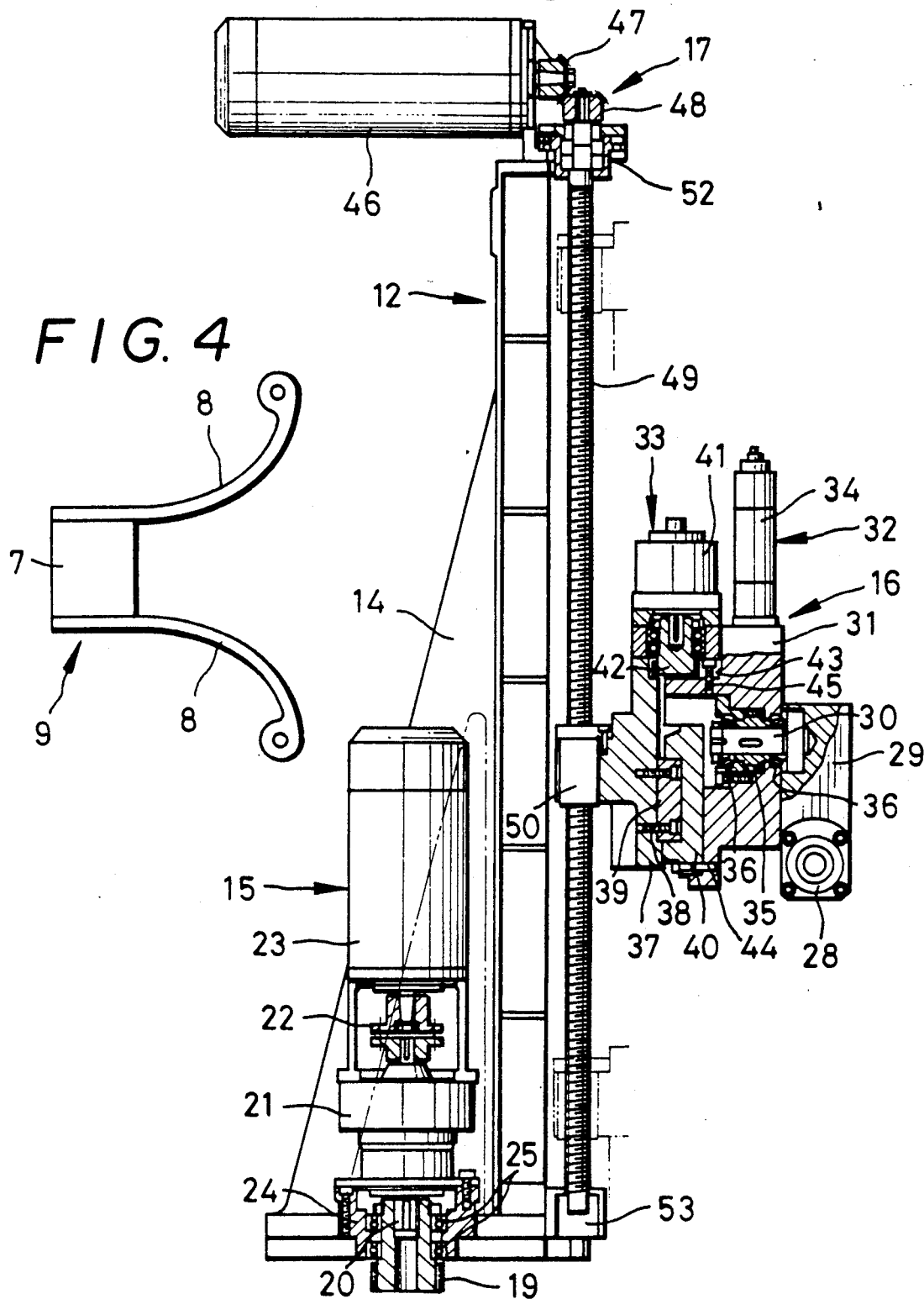

TOOL STORAGE APPARATUS

FIELD OF THE INVENTION AND RELATED ART STATEMENT

The present invention relates to a tool storage apparatus. It is a customary practice in a machine tool, such as in a machining center, that a plurality of tools which have been stored in a tool storage apparatus are attached or detached for replacement to the spindle of a machining center by means of an automatic tool changer.

Conventionally, the respective tools in a tool storage apparatus are stored in a tool holder provided on a conveyor chain and the tool in question is carried to the replacement position by a chain and replaced there by a tool changer. Since a chain has been conventionally used for transporting the tool to the replacement position, the length of the chain had to be extended when the number of the tools to be stored and exchanged was increased. As a result the running path for the chain had to be complicated and a larger space was required. Furthermore, since tools were transported to the replacement position by means of a chain, longer time was required to bring the tool located at a long distance from the replacement position to the position of replacement.

There was a further problem with the tool storage apparatus according to a prior art in that if the apparatus is once installed, the chain had to be entirely changed if it was desired to increase the number of the tools to be stored was, such that expansion of the tool storage apparatus was not easy.

OBJECT AND SUMMARY OF THE INVENTION

Accordingly an object of the present invention is to eliminate the problems as above discussed with regard to the prior art and provide a tool storage apparatus capable of storing a number of tools within a limited small space, easily and optionally expanding the capacity and transporting the respective tools to the replacement position within a short period of time.

The above-mentioned object of the present invention has been solved firstly by a tool storage apparatus having a holder unit comprised of a strut and a multiplicity of holders adapted to hold tools respectively and detachably mounted to a machine base, two rows of said holders, each row comprising a specified number of holders arranged vertically one above another with a specified space in between holders, being arranged at the opposite sides of said strut and the tools holding openings for each holder in the respective rows being opened in the opposite direction relative to each other.

The above-mentioned object of the present invention has been solved secondly by a tool storage apparatus including at least one holder unit detachably attached to the base and a transfer means adapted to transport tools between the holder in question in the holder unit and the replacement position said transfer means further including a grip case adapted to grip a tool, a transfer drive means adapted to transport the grip case between the respective holder units, a lift means adapted to lift the grip case, a forward and rearward drive means adapted to move the case forwardly or rearwardly toward the holder and a rotary drive means adapted to rotate the tool around a horizontal axis parallel to the tool transportation direction.

According to the present invention a number of holders are arranged vertically one above another and consequently the tools are arranged one above another, so that the respective tools in question may be easily inserted or taken out of the detachment opening. One holder unit requires only a limited narrow space while a large number of tools can be stored. The holder unit can be detachably attached to the base with a suitable interval, such that expansion of the storage capacity or deletion or displacement of the storage apparatus can be readily complimented.

The maximun distance of transportation of tools for their replacement may be extremely reduced by providing such a transfer apparatus adapted to transfer grip cases for attaching or detaching tools relative to the tool holders between the respective holder units and also adapted to be displaceable vertically.

According to the present invention, a number of tools may be stored in a narrow available space.

According to the present invention, expansion and relocation of the tool storage apparatus may be very easily and rapidly executed.

According to the present invention, by combining the reciprocation motion between the respective holder units and the vertical motion between the respective holders, the distance of movement between any two of the holders and the position of replacement of the tools may be reduced and the maximum distance of movement may be limited substantially to such a distance as corresponding to the orthogonal distance between the upper and lower ends at the opposite side ends of the holder, whereby the time required for replacement of tools may be reduced and such a long distance as required in a prior art connecting all tools is no more necessitated.

Since the entire holder unit may be replaced at one time, attachment of tools to the tool holder must not necessarily be executed at the location of a machine tool. Attachment of tools to a tool holder may be done at a different location from that of a machine tool and then the holder unit with tools thus attached in advance may be attached at the place of use, thus the work at the machining site may be simplified.

According to the present invention, since the transfer apparatus is only one movable part at the time of replacement of tools, and no such members which generate noise as chains are not required, noise likely to the generated by the tool storage apparatus may be prevented.

Further according to the present invention, since each holder unit may be exchanged individually, partial replacement of tools may be easily executed.

BRIEF DESCRIPTION OF THE DRAWINGS

FIG. 3 is the plan view of the machine tool in FIG. 1;

FIG. 4 is the schematic view of the holder element constituting a holder;

FIG. 5 is the fragmentary sectional view of the transfer apparatus;

DESCRIPTION OF THE PREFERRED EMBODIMENT

The present invention will now be explained in detail with reference to the illustrated embodiments.

Figure 1:
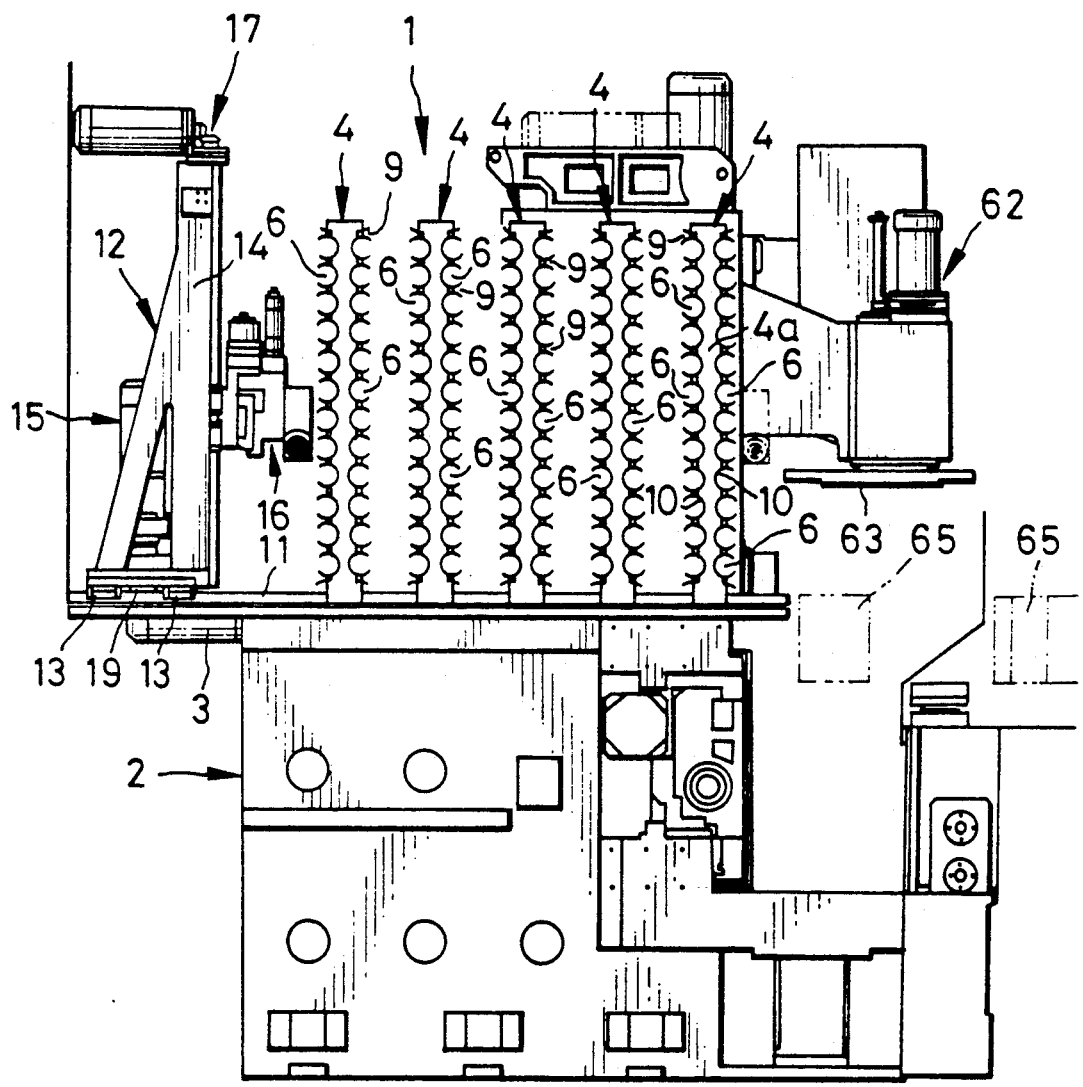
FIG. 1 is the front view illustrating a machine tool equipped with the tool replacement apparatus according to the present invention.
Figure 2:
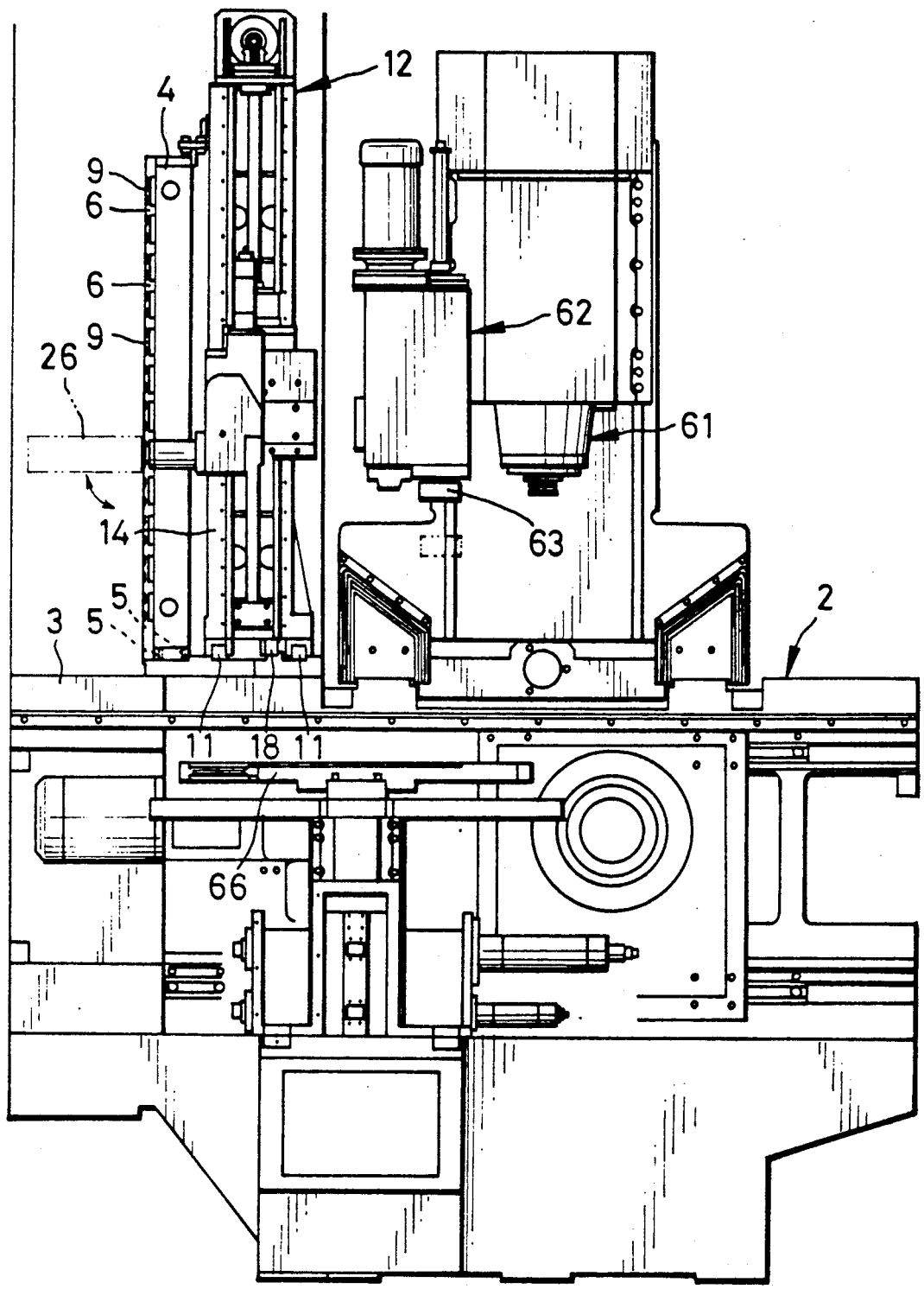
FIG. 2 is the left side view of the machine tools in FIG. 1.

In FIG. 1 through FIG. 3, the tool storage apparatus includes a base 3 which can be conveniently secured at a suitable location such as a floor or a frame or the like of a machine tool 2.

To the base 3, there is detachably secured a suitable number of holder units 4, five holder units 4 in the case of the present illustration, by means of bolts. That is, any suitable number of holder units 4 may be provided on the base 3 as long as the space of the base permits. Conversely any suitable number of holder units may be removed when they are no longer in use.

Holders 6 which are spaced from one another in the vertical direction with a specified distance between the holders are provided at each unit 4. More specifically two rows of holders, each row comprising for example twelve holders, are provided at the left and right sides of the strut 4a as illustrated. One holder unit 4 holds 24 holders in the case of the present illustration. The number of holders is just an example and any desired number of holders 6 for the respective holder unit 4 may be selected.

Each holder 6 comprises for example as shown in FIG. 4 of a holder elements 9 with two springs 8 fixed to the base member 7. Two springs 8 are fixed to the opposite sides of the base member 7 in a manner to curve outwardly. The respective holder elements 9 are fixed to the strut 4a of the holder unit 4 with suitable intervals between the element and one of the two springs of the vertically adjacent holder element 9 forms a pair with the oppositely facing one of the two springs of the adjacent holder element to provide a holder 6. The strut 4a is provided with curved recesses 10 for enabling the tools to be inserted in the respective holders 6. The respective holder 6 is adapted to grasp a tool in a substantially circular fashion by means of a curved recess 10 and a pair of springs 8. When a tool is attached, the tool is inserted through the opening defined by the end portions of a pair of springs 8. At this time, the spring 8 is elastically forced open and when the tool is properly inserted, it is elastically restored to the original shape to elastically grip the tool.

A pair of tracks 11 are laid on the base 3 on which the transfer apparatus runs and is guided. As shown in FIG. 5 through FIG. 9, the transfer apparatus 12 is provided with a frame 14 having runners 13 such as wheels or ball bushes, or the like. The frame 14 is provided with the transfer drive means 15 adapted to transfer the frame 14, a tool replacement device 16 for detaching and replacing a tool relative to the holder and a lift means 17 adapted to lift the tool replacement device.

The transfer drive means 15 includes a rack 18 secured to the base 3 and extending in the direction of movement of the transfer apparatus 12, a pinion adapted to intermesh with the rack, a reduction gear 21 for fixedly supporting the pinion 19 on the output shaft 20, and a drive motor 23 coupled to the reduction gear 21 by the coupling 22. Driving force of the drive motor 23 rotates the pinion 19 by way of the reduction gear 21 and rolling of the pinion 19 relative to the rack 18 causes the frame 14 to run along the tracks 11. Forward or reversed rotation of the drive motor 23 results in reciprocation of the frame 14. In the illustrated example, the pinion 19 is supported by the casing 24 secured to the reduction gear 21 by way of the bearing 25. Depending on the location of the reduction gear 21 being attached, the casing 24 and the bearing 25 may be omitted.

The tool changing device 16 includes the gripping case 28 adapted to grip the gripping part 27 of a tool 26, the arm 29 adapted to fixedly support the gripping case 28, the shaft 30 fixed to the arm 29, the casing 31 adapted to rotatably support the shaft 30, the rotary drive means 32 carried by the casing 31 and adapted to rotate the arm 29 and the means 33 for moving the casing 31 forwardly or rearwardly toward the holder 4.

The rotary drive means 32 includes a hydraulic cylinder 34 such as an oil hydraulic cylinder fixed to the casing 31, a rack not shown fixed to the piston rod of the hydraulic cylinder 34 and the rotary drive gear 35 which is intermeshing with the rack, the rotary drive gear 35 being fixed to the shaft 30 rotatably carried by the casing via the bearing 36, when the rack is caused to reciprocate by operation of the hydraulic cylinder 34, the rotary drive gear 35 is rotated to and fro, the to and fro rotating motion of the rotary drive gear 35 being transmitted to the arm 29 by way of the shaft 30 so that the arm 29 will be rotated to and fro around the axis of the shaft 30. In the illustrated example, the arm 29 is rotated to and fro substantially by 90 degrees, such that the position will be changed between the horizontal position in which the tool 26 is held by the holder 6 and extends substantially horizontally and the position to which the tool 26 extend downwardly substantially in the vertical direction.

Figure 10:
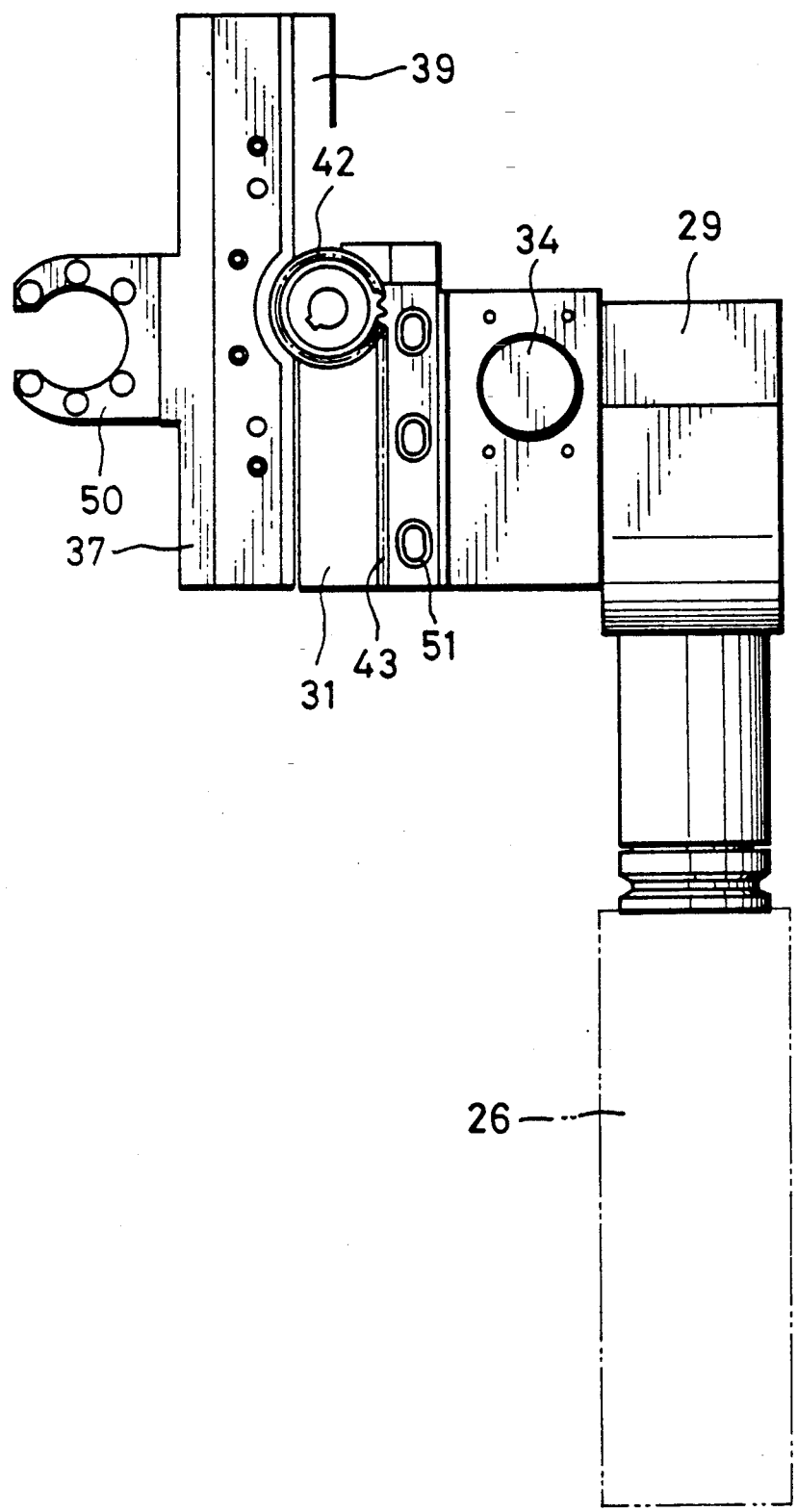
FIG. 10 is the plan view of a tool replacement device.

The forward and rearward movement drive means 33 includes as shown in FIG. 5 and FIG. 10, a base 37, a track 39 fixed to the base 37 by the bolts 38, a slider member 40 slidably guided by the track 39, the forward and rearward drive motor 41 fixedly mounted to the base 37, the pinion 42 fixed to the output shaft of the drive motor 41 and the rack 43 intermeshing with the pinion 42. The forward and rearward movement rack 43 is fixed to or integrally formed with the casing 31. The slider member 40 is fixed to the casing 31 by the bolts 44 while the rack 43 is fixed to the casing by the bolt 45. The rack 43 is formed with an elongated bore 51 in which the bolt 45 is inserted to allow adjustment of the mounting position. The pinion 42 is forwardly or reversely rotated by the forward and rearward drive motor 41 and the forward and rearward movement rack 43 which is in intermeshment with the pinion 42 may be moved forwardly or rearwardly. Forward or rearward movement of the rack 43 causes the casing 31 to be simultaneously moved forwardly or rearwardly. At this time, the casing 31 may be smoothly moved forwardly or rearwardly as the slider member 40 is slidably guided by the track 39 whereby the arm 29 supported by the casing 31 as well as the tool 29 may be moved forwardly or rearwardly in relation to the holder 6.

The base 37 of the forward and rearward drive means 33 is supported by the lift means 17 so that the arm 29 and the tool 26 may be lifted or lowered.

The lift means 17 includes a lift motor 46 fixedly supported by the frame 14 of the transfer apparatus 12, a drive gear 47 fixed to the output shaft of the lift motor 46, a driven gear 48 intermeshing with the drive gear 17 and a vertical threaded shaft 49 to which the driven gear is fixed and rotatably supported by the frame 14. The threaded shaft 49 is supported by the bearings 52, 53 adjacent the lower and upper ends. The drive gear 47 and the driven gear 48 are bevel gears in the illustrated example, but they may be spur gears, depending on the position of the lift motor 46.

Such a reciprocating member 50 such as a nut or a ball nut to which the threaded shaft 49 is attached and which is movable axially in relation to the threaded shaft 49 by rotation of the shaft is fixed to the base 37 of the tool changing device 16 and the base 37 and the tool changing device 16 may be raised or lowered by rotation of the threaded shaft 49 driven by the lift motor 46. Since the base 37 includes a movable member 55 such as a wheel or a ball bush which is guided by the rail 54 (FIG. 6 and FIG. 7) provided on the frame 14, the base 37 may be smoothly raised or lowered.

The base 3 is fixed to the frame of a machine tool 2, for example a machining center or integrally formed therewith or the floor and the main spindle 61 of the machine tool is disposed at the side opposite to the holder unit with the movement path (or two tracks 11) of the trasnfer apparatus 12 located therebetween. The change arm device 62 adapted to change the tools is arranged at the frame of the machine tool between the spindle 61 of the machine tool and the transfer apparatus 12.

The change arm device 62 is rotatably pivoted at the center and includes the changing arm 63 (FIG. 1) of a known construction having tool gripping fingers at the opposite ends. The change arm 63 of the change arm device 62 is rotatable forwardly or reversely by a predetermined angle or vertically movable.

Operation of the inventive apparatus will now be explained.

Figure 6:
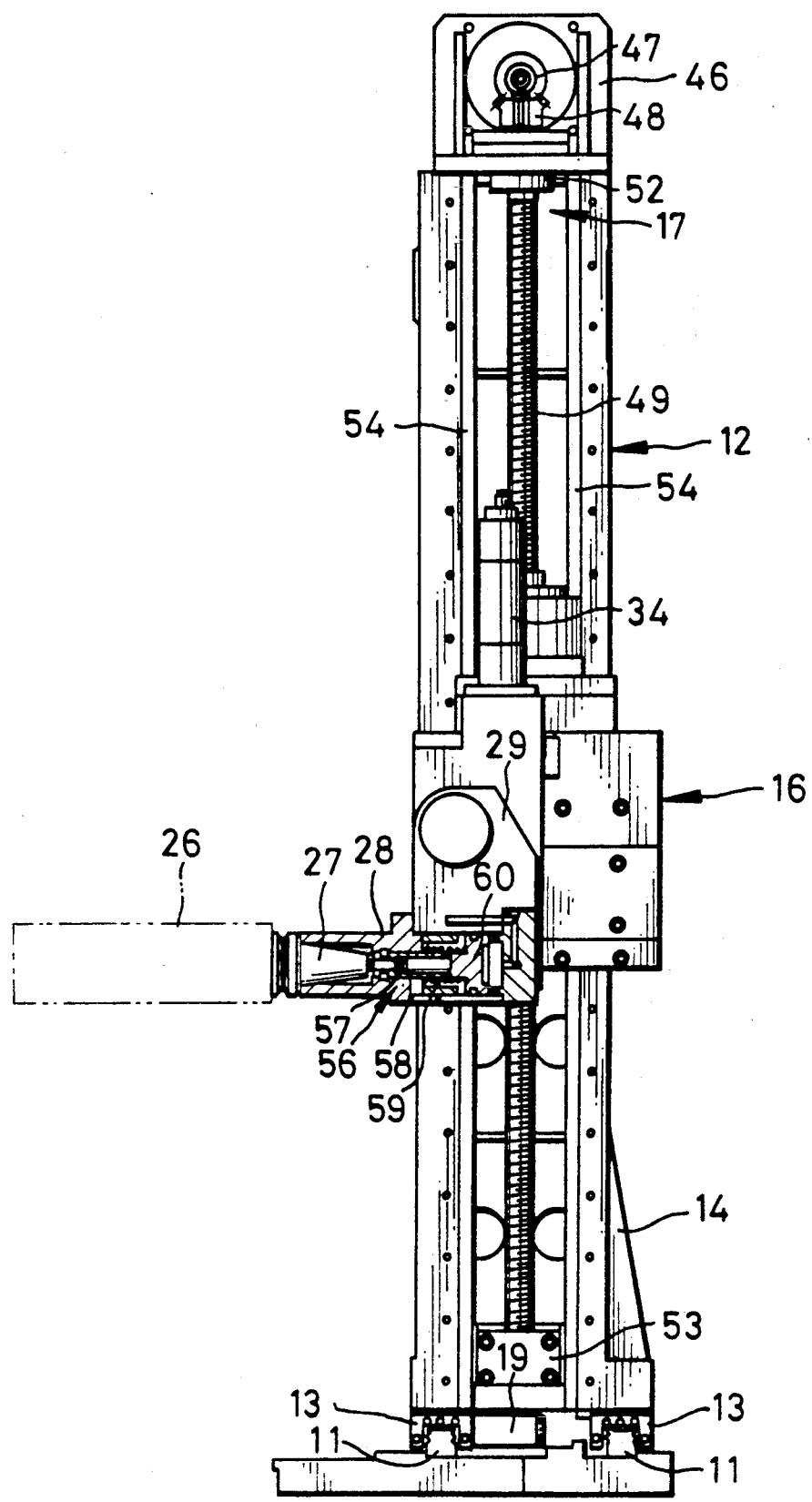
FIG. 6 is the fragmentary right side elevation of the apparatus in FIG. 5.
Figure 7:
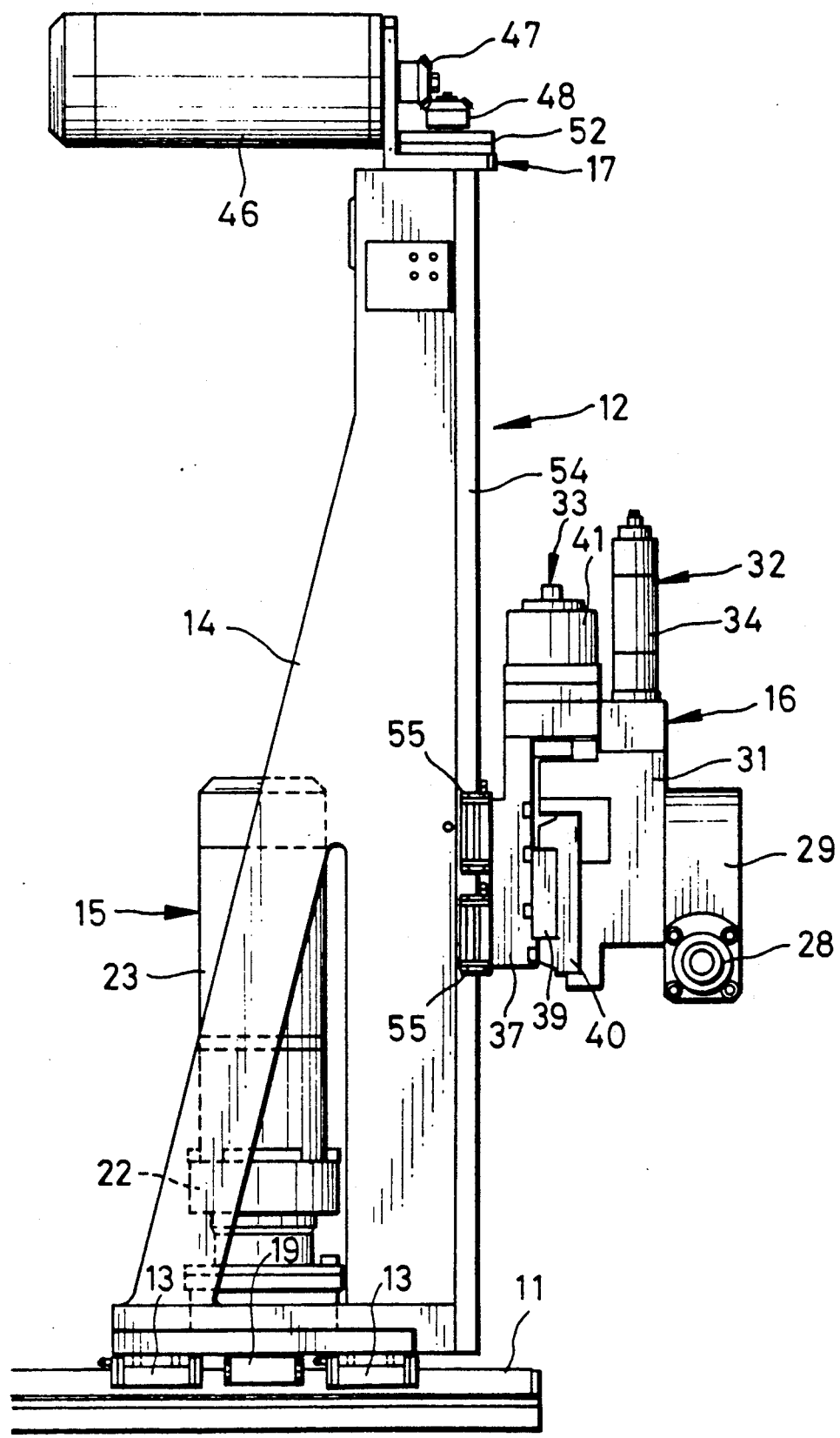
FIG. 7 is the front view of the transfer apparatus.
Figure 8:
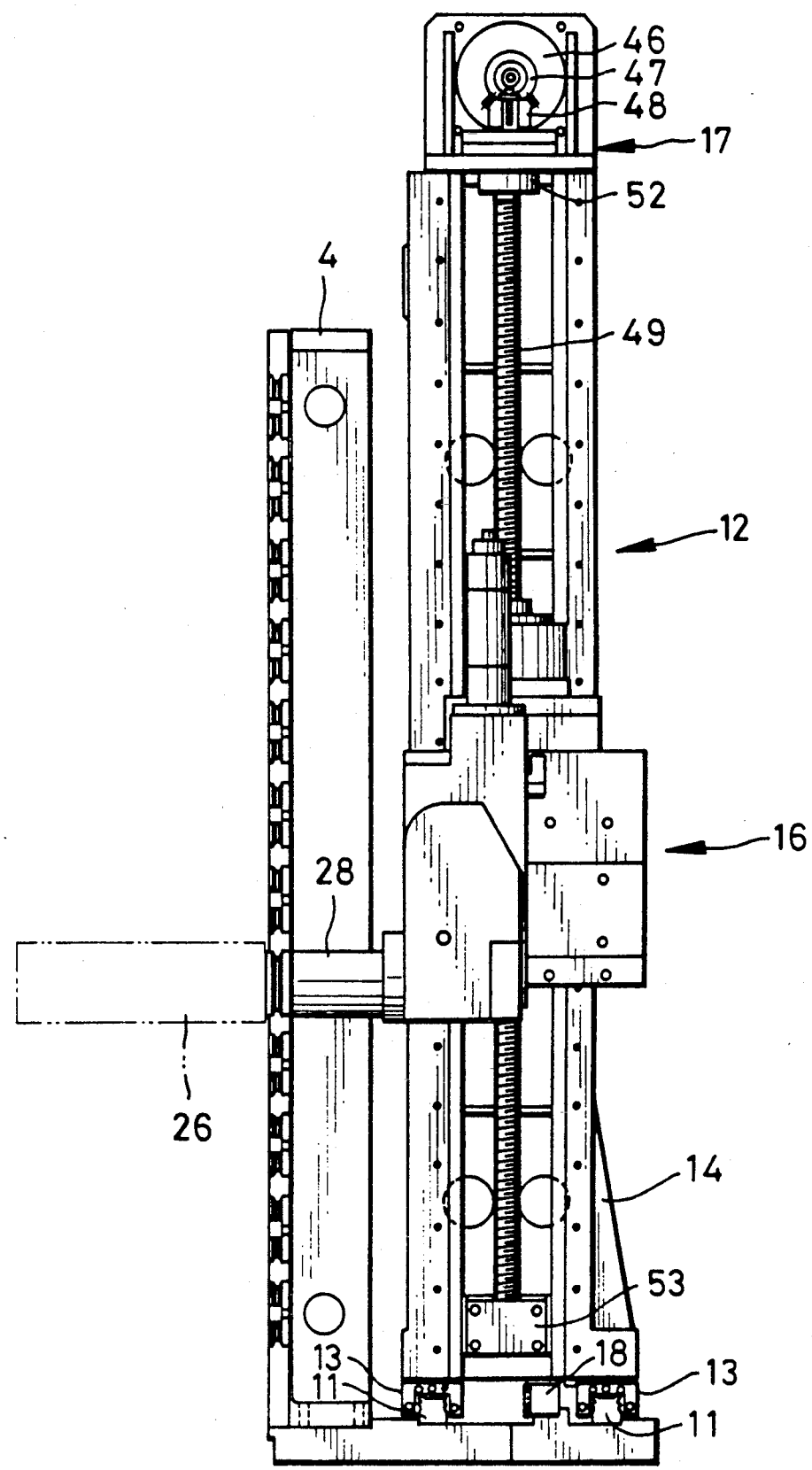
FIG. 8 is the right side view of the transfer apparatus and the holder unit.
Figure 9:
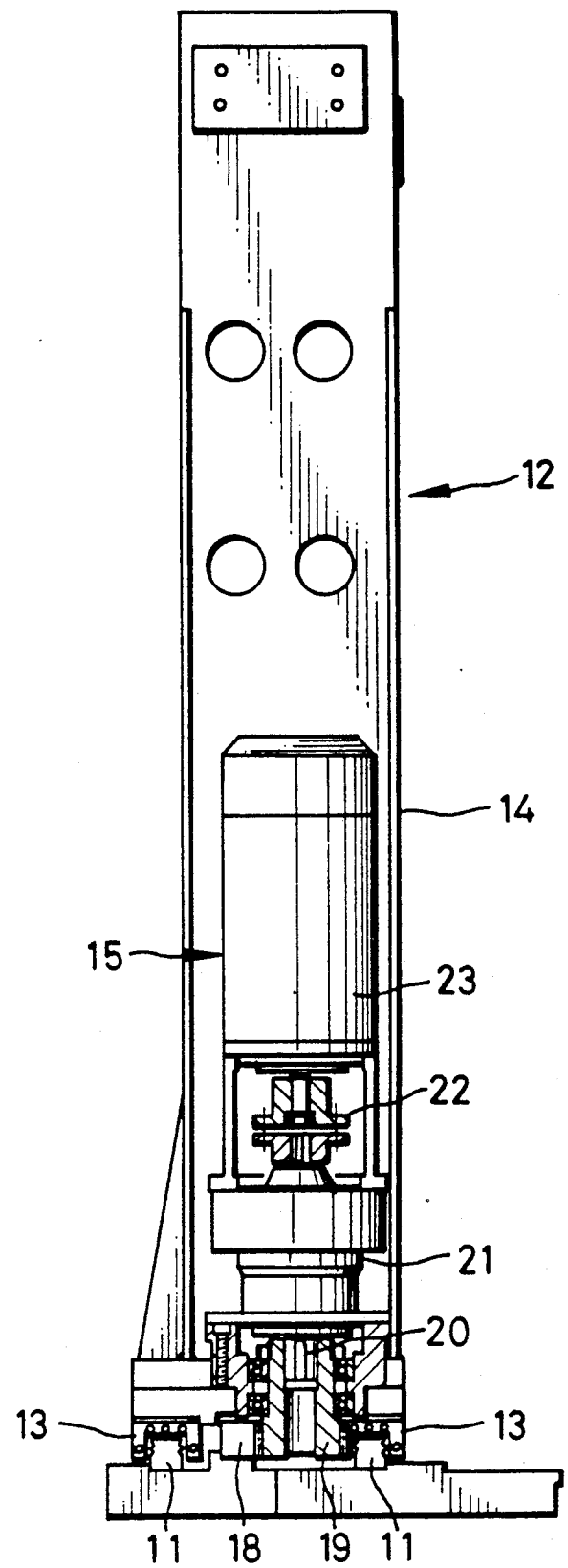
FIG. 9 is the partially sectioned left side view of the transfer apparatus.

The tools are held at their corresponding holders 6 of the holder unit 4 and the transfer apparatus 12 waits for operation at the location shown in FIG. 1. At the waiting position, the arm 29 of the tool changing device 16 is in such a condition (as shown in FIG. 6) with the axis of the gripping case 28 extending substantially in the horizontal condition.

When the address at which the tool to be removed for replacement is specified by the signal from the control unit, then the frame 14 is moved to the corresponding position by operation of the transfer drive means 15. Almost simultaneously or simultaneously with movement of the frame 14, the lift device 17 is activated and the tool changing device 16 is raised or lowered until the gripping case 28 is stopped at the position oppositely facing the tool in question. Then operation of the forward and rearward movement means 33 causes the casing 31 or the gripping case 28 to move forwardly toward the tool 26 held at the holder unit 4. Then the gripping part 27 of the tool 26 is inserted in the gripping case 28 and the tip end of the gripping part 27 is clamped by the clamp device 56 in the gripping case 28, such as the sleeve 58 having a plurality of balls 57. The clamp device 55 is always urged by a spring 59 in the clamping condition and the clamping condition may be released by pushing the piston 60 by means of fluid pressure such as air or the like.

When the tool 26 is clamped, the transfer apparatus 12 or the frame 14 is moved rightwardly or leftwardly a short distance defined by the opening of the holder 6 and the tool 26 is released from the holder 6.

When the holder 26 is released from the tool 26, the forward and rearward movement means 33 is operated to return the arm 29 to a specified location. Subsequently, or simultaneously, the rotary drive means 32 is activated and rotated as shown by the chain line in FIG. 2 to bring the tool into the position facing substantially downwardly. Simultaneously or almost simultaneously with rotation of the means 32, the tool is moved to a specified level and held thereat.

Subsequently operation of the transfer drive means 15 causes the frame 14 to be moved to and stopped at the location where the tool is changed by the change arm means 62.

When machining by use of the spindle of the machine tool is finished and a tool change instruction is issued, the change arm 64 of the change arm means 62 is rotated in the anti-clockwise as view in FIG. 3 from the waiting position and one of the gripping fingers is caused to grip the tool 26 of the gripping case 28. Then the change arm 64 is lowered and the tool is withdrawn from the spindle 61 and the grip case 28.

Then the change arm 62 is rotated in the anti-clockwise direction by 180 degrees and raised so as to place a new tool on the spindle and insert the lowered tool into the grip case 28. Subsequently, the change arm 62 is reversed in the clockwise direction to the waiting position and the gripping finger 64 is moved away from the tool.

The transfer apparatus 12 is moved to the position laterally of the holder 6 at the position where the used tool is returned or the position intermediate of holder units 4. The arm 29 is rotated to a substantially horizontal position and advanced to a specified position as required. Subsequently the transfer drive means 15 is activated to move the frame 14 so that the tool 26 is pushed in the holder 6 and clamped by means of springs 8 and fixed therein.

After that, the gripping case 28 is retracted so that the tool may be released from the gripping case 28. With the above-mentioned operation, one cycle of tool change is completed and the transfer apparatus 12 is restored to the waiting position or commences to move to the position of a next tool for next tool changing cycle.

For information not directly relating to the present invention, a work 65 may be changed by a different change arm 66.

Although, in the illustrated example, the spindle 61 is vertically supported, the present invention may be applied as well when the spindle is horizontally supported. In the latter case, the tools are held horizontally when they are replaced.

What is claimed is:

1. A tool storage apparatus in a holder unit comprising a non-rotational strut and a plurality of holders adapted to hold tools respectively and detachably mounted to a machine base, first and second rows of said holders, each said row comprising a specified number of vertically spaced and aligned holders with a specified space between holders, the holders of said first and second rows having tool receiving openings aligned to position tools substantially horizontally and being arranged at opposite sides of said strut, the tool receiving openings for each holder in the first row opening in a direction opposite to the openings for each holder of the second row, whereby the holders of said first and second rows are positioned to receive and release tools in opposite lateral directions.

2. A tool storage apparatus as claimed in claim 1 wherein a plurality of said holder units are detachably attached to the machine base with specified space between the adjacent holder units, whereby the number of holder units may be increased or decreased.

3. A tool storage apparatus as claimed in claim 1 including at least one holder unit, and a transfer apparatus adapted to transfer tools between the corresponding holder of the holder unit and a position for replacement of tools, said transfer apparatus comprising a gripping case for gripping a tool, a transfer drive means adapted to transfer the gripping case to and from the holder units, a lift means for raising or lowering the gripping case and a rotary drive means adapted to rotate a tool around the horizontal axis parallel to the tool transfer direction.

4. The tool storage apparatus of claim 1 wherein said holders comprise a plurality of holder elements having two springs extending from a base member, the two springs of each element curving outwardly in opposite directions, whereby a holder opening is formed between the adjacent springs of a pair of adjacent holder elements.

* * * * *